United States Patent
Biswas et al.

(10) Patent No.: US 8,509,552 B1
(45) Date of Patent: Aug. 13, 2013

(54) DIGITAL IMAGE PROCESSING ERROR CONCEALMENT METHOD

(75) Inventors: Mainak Biswas, Santa Cruz, CA (US); Vipin Namboodiri, Bangalore (IN)

(73) Assignee: Marvell International Ltd., Hamilton (BM)

( * ) Notice: Subject to any disclaimer, the term of this patent is extended or adjusted under 35 U.S.C. 154(b) by 860 days.

(21) Appl. No.: 12/574,078

(22) Filed: Oct. 6, 2009

Related U.S. Application Data

(63) Continuation-in-part of application No. 12/400,207, filed on Mar. 9, 2009, now Pat. No. 8,233,730.

(60) Provisional application No. 61/165,607, filed on Apr. 1, 2009.

(51) Int. Cl.
*H04N 7/50* (2006.01)

(52) U.S. Cl.
USPC ............................. 382/236; 382/232; 382/238

(58) Field of Classification Search
USPC .................... 382/236, 232, 238; 375/240.16, 375/240.03; 348/441, 452, E5.066, 699
See application file for complete search history.

(56) References Cited

U.S. PATENT DOCUMENTS

| | | | | |
|---|---|---|---|---|
| 5,581,308 A * | 12/1996 | Lee | ............................... | 348/699 |
| 5,982,441 A * | 11/1999 | Hurd et al. | .................. | 348/417.1 |
| 7,224,731 B2 * | 5/2007 | Mehrotra | .................. | 375/240.16 |
| 8,064,522 B2 * | 11/2011 | Kondo et al. | ............ | 375/240.16 |

OTHER PUBLICATIONS

M. Bertalmio et al., "Image Inpainting," in Proc. ACM-SIGGRAPH, 2000, pp. 417-424.
T. F. Chan et al., "Variational Image Inpainting," ftp://ftp.math.ucla.edu/pub/camreport/cam02-63.pdf, Dec. 2002.
A. Criminisi et al., "Region Filling and Object Removal by Exemplar-Based Image Inpainting," IEEE Transactions on Image Processing, vol. 13, No. 9, Sep. 2004.
S. Kumar et al., "Spatio-Temporal Texture Synthesis and Image Inpainting for Video Applications," IEEE Conference on Image Processing, Sep. 2005, vol. 2, pp. 85-88.

* cited by examiner

*Primary Examiner* — Anh Do

(57) ABSTRACT

In one embodiment the present invention includes a digital image processing method for concealing errors. The method includes determining error pixel locations based on motion vectors and determining if the error pixel locations in a current frame are on an edge of an object in the current frame. If an error pixel location is on an edge, then a search of pixel values is performed in the current frame along the edge for a replacement pixel value. If the error pixel location is not on an edge, then a search of pixel values is performed in a region adjacent to the edge for the replacement pixel value.

20 Claims, 5 Drawing Sheets

DIGITAL IMAGE PROCESSING ERROR CONCEALMENT METHOD

CROSS REFERENCE TO RELATED APPLICATIONS

This application claims the benefit of priority to U.S. Provisional Application No. 61/165,607, filed Apr. 1, 2009, the disclosure of which is incorporated herein by reference. This application is also a continuation-in-part of and claims the benefit of priority to U.S. patent application Ser. No. 12/400, 207, entitled "Filter Bank Based Phase Correlation Architecture for Motion Estimation", filed Mar. 9, 2009, now U.S. Pat. No. 8,233,730 the entire disclosure of which is incorporated herein by reference.

BACKGROUND

The present invention relates to digital image processing error concealment, and in particular, to occlusion handling for motion compensated interpolated frames.

In a digital image processing system, images are represented as binary data (discrete values represented as zeros and ones). Changing images, such as video or graphics, are typically broken down into a stream of frames. Each frame may include a number of static objects represented by an array of pixels. Different values for different pixels correspond to a wide range of colors (e.g., RGB or YUV) across each frame to represent different visual objects in the frame. In a video or graphics system, for example, the objects may change location from frame to frame, thereby creating the appearance of movement.

FIG. 1 illustrates an image 101 with a moving object 102. Object 102 may move across the image with a velocity, v, which specifies both the direction and speed of the object's movement across the image. As objects move across an image from frame to frame, leading edges of an object may cover some background images and trailing edges of the object may uncover other background images. This is illustrated in FIG. 2, which shows the movement of an image across multiple frames. In FIG. 2, an object 102 changes location between frames 201A and 201B. In this example, object 102 moves horizontally a distance, d, between frames. As illustrated in frame 201C, a first region 211 is occluded by the leading (or forward) edge of the object, and a second region 210 is revealed by the trailing (or rear) edge of the object.

The occlusion of background images by the leading edge of a moving object and the revealing of background images by the trailing edge of a moving object often results in error regions in the images and can impact image quality. For example, a typical artifact that is associated with the occlusion is a "haloing" artifact around object boundaries. There are at least two causes of such an artifact. First, errors may result from a coarse motion grid. Typical motion estimation algorithms do not estimate motion at pixel grid level. Rather, the typical resolutions of the motion estimation algorithms are either 8×8 pixels or 4×4 pixels, for example. This coarse resolution causes an inadvertent discontinuity around boundaries. Second, motion estimators may not be able to reliably measure around object boundaries using information from two input frames. The useful information may only be present in one of the frames, and thus, block based motion estimation techniques may result in large errors around the boundaries and estimate incorrect motion. The area of ambiguity may be dependent on the motion between the foreground and the background images as well as the temporal position of the interpolated frame.

SUMMARY

Embodiments of the present invention improve calibration of analog and digital circuits. In one embodiment the present invention includes a method comprising comparing a plurality of pixel values in a current frame to a plurality of reference values. The plurality of reference values are based on a plurality of pixel values in a previous frame modified by a plurality of motion vectors associated with the plurality of pixel values in the previous frame. The method further includes, for each pixel value in the current frame that differs from a corresponding reference value by an amount greater than a predefined threshold, determining if an error pixel location corresponding to the pixel value in the current frame is on an edge of an object in the current frame, if the error pixel location is on the edge, then performing a search of pixel values in the current frame along the edge for a replacement pixel value, and if the error pixel location is not on the edge, then performing a search of pixel values in a region adjacent to the edge for the replacement pixel value.

In another embodiment, the present invention includes an image processing system comprising a front end to receive transmitted image data in a transmitted format and produce digital image data, a format converter to convert the digital image data into a native system format, the format conversion, and a motion compensator. The motion compensator compares a plurality of pixel values in a current frame to a plurality of reference values. The plurality of reference values are based on a plurality of pixel values in a previous frame modified by a plurality of motion vectors associated with the plurality of pixel values in the previous frame. For each pixel value in the current frame that differs from a corresponding reference value by an amount greater than a predefined threshold, the motion compensator determines if an error pixel location corresponding to the pixel value in the current frame is on an edge of an object in the current frame. If the error pixel location is on the edge, then a search is performed of pixel values in the current frame along the edge for a replacement pixel value, and if the error pixel location is not on the edge, then a search is performed of pixel values in a region adjacent to the edge for the replacement pixel value. The system further includes a display driver to drive compensated frames to a liquid crystal display.

The following detailed description and accompanying drawings provide a better understanding of the nature and advantages of the present invention.

DETAILED DESCRIPTION

Described herein are techniques for concealing errors in digital images. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Features and advantages of the present invention include a method for error concealment in digital images with moving objects. In one embodiment, the location of regions with high error are determined and more accurate replacement pixels are generated based on an in-painting technique described below. For example, in-painting uses the spatial and temporal pixels around an error region to estimate the pixels with the lowest error to be used as replacement pixels. The method described herein may be implemented in an image processing system, for example, as described in more detail below.

Figure 1:
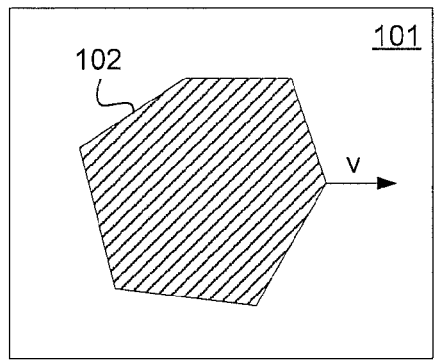
FIG. 1 illustrates an image with a moving object.
Figure 2:
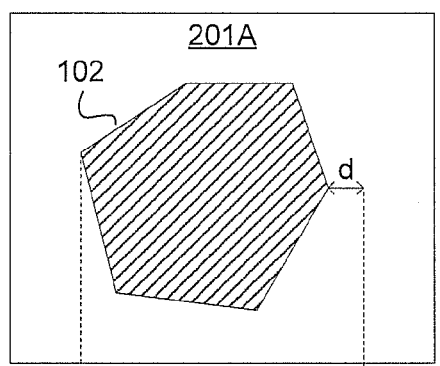
FIG. 2 illustrates the movement of an image across multiple frames.
Figure 2:
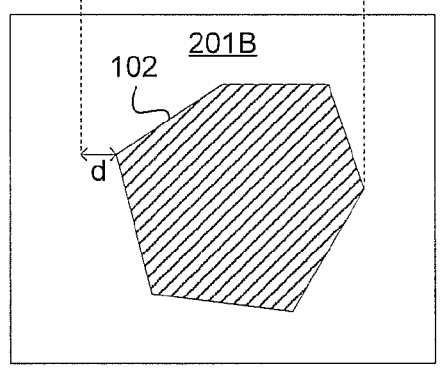
Figure 2:
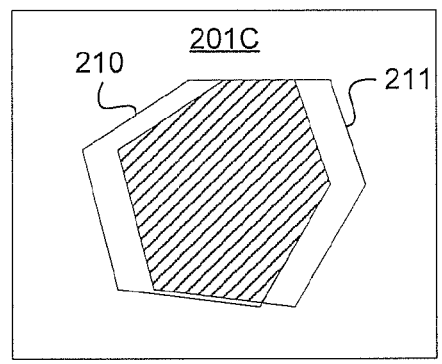
Figure 3:
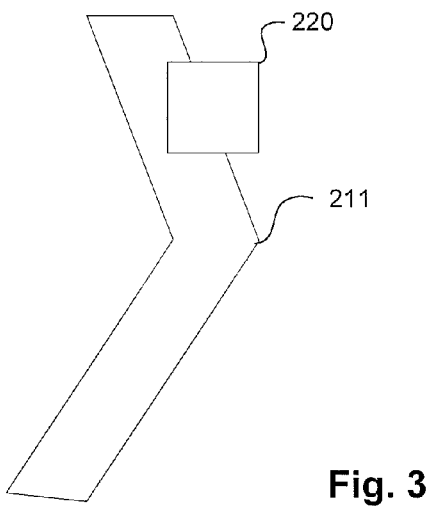
FIG. 3 illustrates an occlusion region and associated error.

FIG. 3 illustrates an occlusion region and associated error. Generally, when a foreground object moves onto the background, a motion estimator using information from the successive frames may not find a good match in the region that undergoes occlusion. In this example, occlusion region 211 may result in an error region 220, where pixel values may need to be replaced to improve the image quality. While the disclosure below is described in the context of occlusion, it is to be understood that the techniques described herein may also be applied to a region that undergoes uncovering. As described in more detail below, embodiments of the present invention may use motion vector profiles to decide whether to copy information from the foreground or from the background to correct for occlusion errors. Image information from the spatial neighborhood may be used to replace information in the error region and improve image quality.

Figure 4:
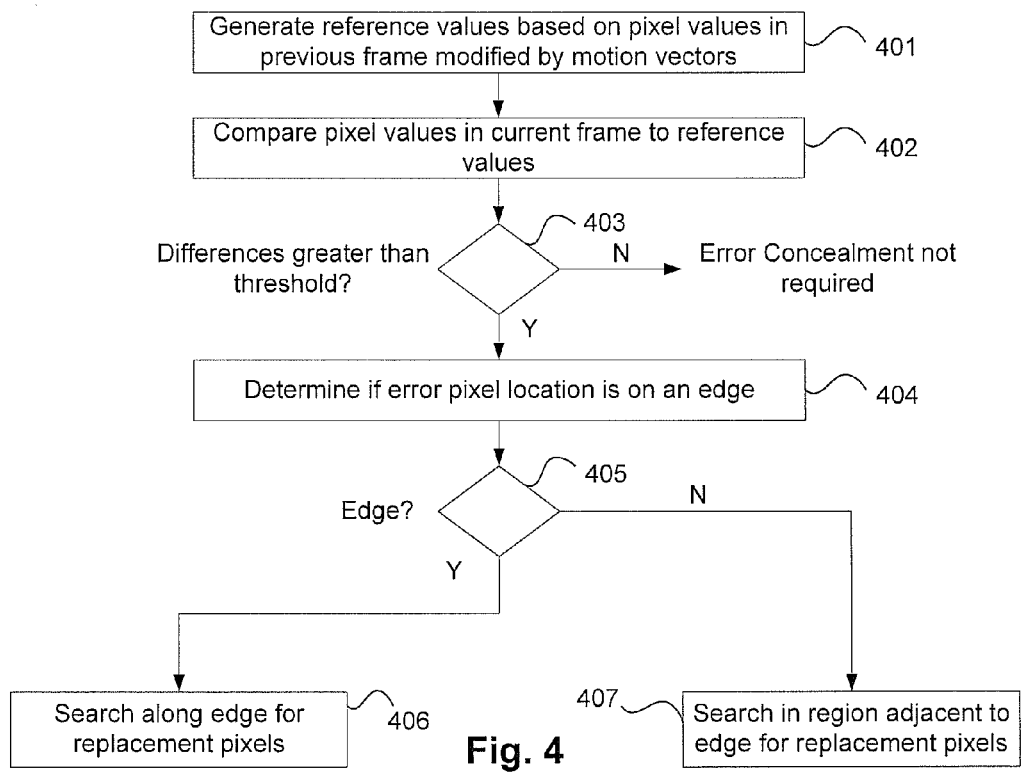
FIG. 4 illustrates a method of concealing errors in a digital image according to one embodiment of the present invention.

FIG. 4 illustrates a method of concealing errors in a digital image according to one embodiment of the present invention. In one embodiment, a current frame, a previous frame, and a motion vector may be used to determine the location of pixels in the current frame with unacceptably high error. As mentioned above, both the current frame and the previous frame may comprise arrays of pixels and corresponding pixel values. Each pixel may further have an associated motion vector. Motion vectors may specify the motion of one or more objects represented in each frame. For example, the previous frame may include motion vectors that specify a velocity vector for each pixel. If an object is moving across the image between frames, the motion vector may have large values for pixels that are near edges of the object, for example. Other pixels may have smaller or even zero motion vector values in other parts of the image. In one embodiment, motion vectors may be used to generate reference values. For example, at 401, reference values are generated based on pixel values in a previous frame modified by the associated motion vectors. The result may include an array of reference values that may be compared to the current frame. At 402, pixel values in the current frame are compared to the reference values. For example, if the pixel values in the current frame meet (e.g., match) the reference values, then the motion vectors may be a satisfactory representation of the movement of the object across the image. However, if a pixel value in the current frame does not meet (e.g., differs from) a corresponding reference value (e.g., a value derived from the same pixel in the previous frame), then the motion vector may not be a valid representation of the movement of the object across the screen. If a pixel value in the current frame differs from a corresponding reference value by an amount greater than a predefined threshold, which may be set by performance requirements, for example, then the motion vector is deemed invalid and the pixel in the current frame is replaced according to the process described below. In one embodiment, the comparison produces difference values for some or all pixels in the current frame based on the pixel values in the previous frame and the associated motion vectors. In one specific example, the comparison may include calculating the sum of absolute values of differences ("SAD values") between the pixel values in the current frame and the reference values. One example system and method for generating motion vectors in a motion compensated image processing system is disclosed in commonly owned U.S. patent application Ser. No. 12/400,207, entitled "Filter Bank Based Phase Correlation Architecture for Motion Estimation", filed Mar. 9, 2009, the entire disclosure of which is incorporated herein by reference.

At 403, the system determines if the difference between the pixel value in the current frame and the reference value is greater than (or equal to) a threshold. If not, then the motion vector is deemed valid and no errors are corrected (i.e., error concealment may not be required). If the difference is greater than (or equal to) a threshold for any pixel, then the system determines if the location of the erroneous pixel (the pixel having an associated invalid motion vector) is on an object edge at 404. Embodiments of the present invention may search for potential replacement pixels differently depending upon whether or not the erroneous pixel is located on the edge of an object in the image. If the error pixel location is on an edge, at 405, then the system may perform a search of pixel values in the current frame along the edge (sometimes referred to as a detailed region) for a replacement pixel value at 406. If the error pixel location is not on an edge, then the system may perform a search of pixel values in a region adjacent to the edge (sometimes referred to as a non-detailed region or texture region) for the replacement pixel value at 407.

Figure 5:
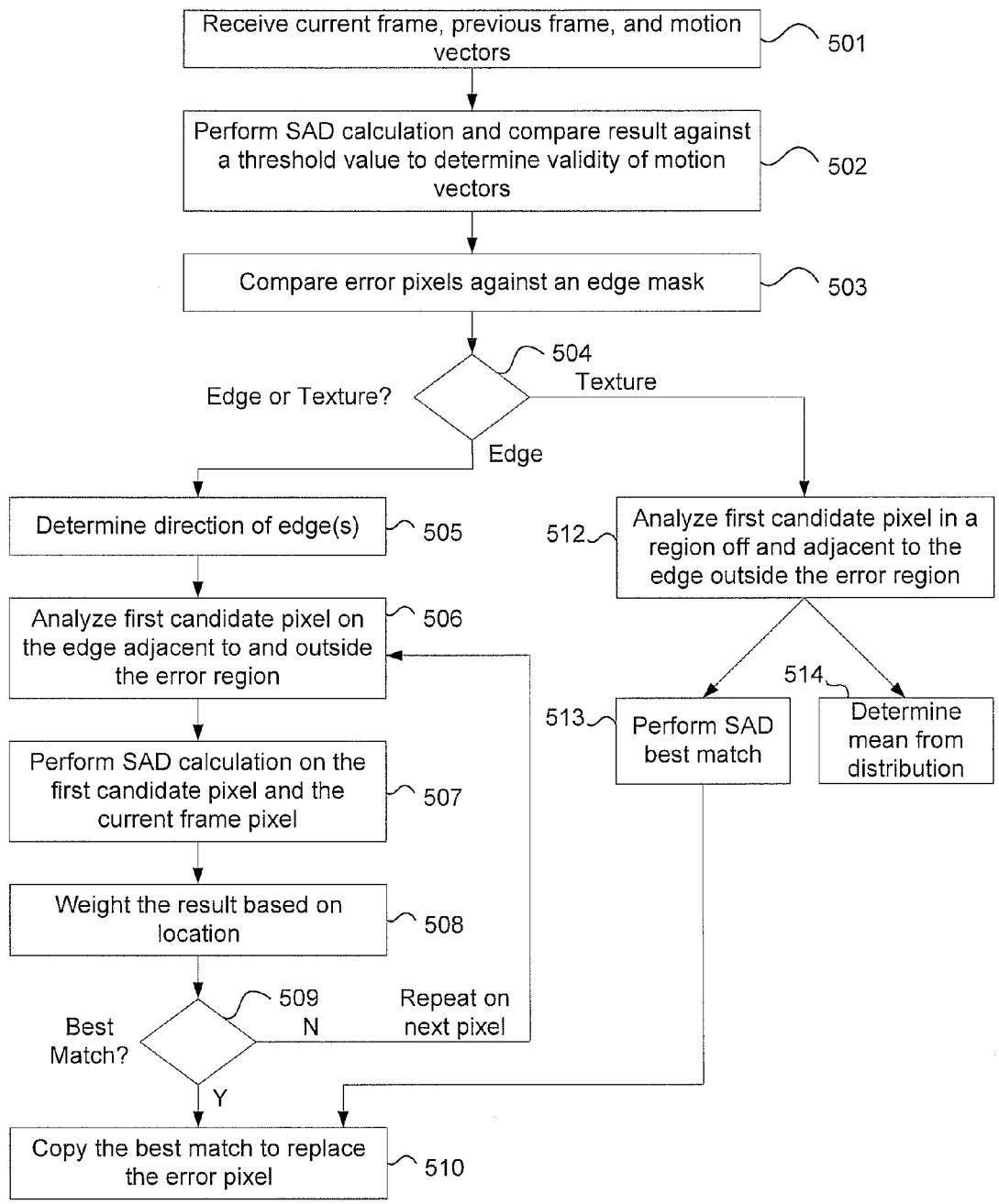
FIG. 5 illustrates a detailed example process for error concealment according to one embodiment of the present invention.

FIG. 5 illustrates a detailed example process for error concealment according to one embodiment of the present invention. At 501, a current frame, a previous frame, and a motion vector are received. At 502, a SAD calculation is performed and the result is compared against a threshold value to determine which motion vectors are valid and which motion vectors are invalid. At 503, error pixels are compared against an edge mask (described below) to determine if the error pixels are located on an edge. At 504, the process chooses between an edge search algorithm and a texture search algorithm to conceal the errors. For example, if error pixels are located on an edge, then an edge search algorithm is used. If pixels are not located on an edge, then a texture search algorithm is used. At 505, if the edge search algorithm is selected, the direction of the edge is determined for an edge search. At 506, a first candidate pixel on the edge adjacent to and outside the error region is analyzed. As mentioned above, the error region is region of the image where pixel values in the current frame differ from corresponding reference values by an amount greater than a threshold. In one embodiment described below, a defined region of pixels (e.g., N×M) may be used to find a best match replacement pixel. At 507, a SAD calculation is performed on the first candidate pixel and the current frame pixel (or defined region of pixels). At 508, the result is weighted based on location as described in more detail below. At 509, a determination is made as to whether a best match is found. The best match may be the best weighted SAD match across a predefined number of pixels/pixel regions along the edge, for example. If the best match is not found, operations in connection with 506, 507, and 508 are repeated. At 510, if the best match is found, the best match is copied to replace the error pixel. Referring back to 504, if the error pixel is not on an edge, the process proceeds to 512 rather than 505. At 512, a first candidate pixel in a region off and adjacent to the edge outside the error region is analyzed. As described in more detail below, at least two alternative embodiments may be used for determining if candidate pixels are suitable replacement pixels. First, a SAD best match search may be performed across a texture region at 513. The best match pixel in the textured region off the edge may be copied to replace the error pixel at 510. Second, the distributions of texture regions may be analyzed and the error pixel may be assigned a mean or average value of the distributions at 514. The above process is further explained in FIGS. 6A and 6B.

Figure 6A:
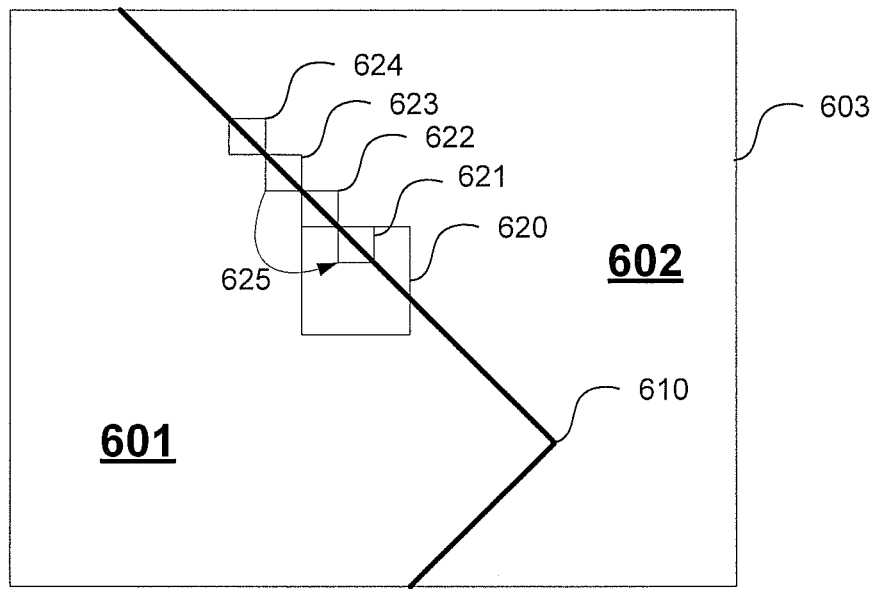
FIG. 6A illustrates an edge search and pixel replacement process according to one embodiment of the present invention.

FIG. 6A illustrates an edge search and pixel replacement process according to one embodiment of the present invention. This example shows a portion of a frame 603 including an edge 610 and an error region 620. Error region 620 may be a region where pixels located in the region have corresponding invalid motion vectors, for example. As mentioned above, the process for concealing the error region 620 may include receiving a current frame, a previous frame, and a motion vector for each pixel in the previous frame, and the error region may be determined by comparing a SAD calculation on each of the pixels in the previous frame interpolated using an associated motion vector. FIG. 6A illustrates the use of edge based continuity to fill in the information for the detailed edge region from surrounding detailed edge regions. In some embodiments, a block of pixels (or patch kernel) may be replaced together. The patch kernel size may be programmable. For example, in one embodiment the patch kernel size may be set to 11×5 pixels, but in other embodiments the size can be either smaller or larger than this size.

In FIG. 6A, the edge 610 is projected across the error region 620, and an error pixel at 621 on edge 610 may be replaced by searching along the edge 610 for a replacement in a region outside the error region 620. Data representing the edge 610 may be analyzed and the direction of the edge 610 may be computed in the error region 620 (e.g., using a linear projection). In one embodiment, the edge 610 may be represented by an edge mask. An edge mask may be derived from the image by extracting boundaries of objects in the image. Edge locations in a frame of an image may be represented as white areas and non-edge locations may be represented as black areas, for example. Edges in an edge mask may be one pixel in width or even several pixels in width, for example. An edge mask may be used to determine if a particular error pixel is on an edge or not. If an error pixel is located on an edge pixel in an edge mask, then the error pixel location may be considered on an edge. Similarly, if an error pixel is located off an edge pixel (on a non-edge pixel location) in an edge mask, then the error pixel location may be considered not on an edge.

Initially, the system may define a region (or patch) centered on the target pixel that needs to be filled or replaced (e.g., an 11×5 block of pixels). The closest match around the error region along the edge direction is chosen as the candidate match. This ensures the edge continuity in the target pixel that needs to be filled. In one embodiment, the error match criterion may be a function of the minimum SAD error, and optionally, the distance from the error region to be filled (e.g., the target region), for example. The distance criterion may be used to ensure homogeneity of pixels in the error corrected frame (e.g., the interpolated frame). If an error is filled using pixels located far away, then the interpolated frame may have a discontinuity. In the example of FIG. 6A, the system searches along edge 610 and may perform a SAD match with pixels at 622, 623, and 624. The match may be obtained from the edge pixel at 623. Here, each match may be weighted based on the distance from the error pixel to be replaced, where candidate pixels located closer to the error pixel are weighted more than candidate pixels located farther away. An example weighting may be as follows: SAD, SAD/2, SAD/4, etc. . . . , where the SAD values are attenuated more if the pixels are farther away from the error pixel. This weighting is optional, and may not be included in some embodiments. In this example, the edge pixel at 623 may be weighted less than the edge pixel at 622. However, the match at 623 may be sufficiently better such that it overcomes the weighting. Accordingly, the pixel at 623 is selected as the best replacement, and it may be copied to replace pixel 621 as illustrated at 625. This process may be repeated (e.g., from opposite sides of the error region) until the edge 610 is filled in across the error region 620.

Figure 6B:
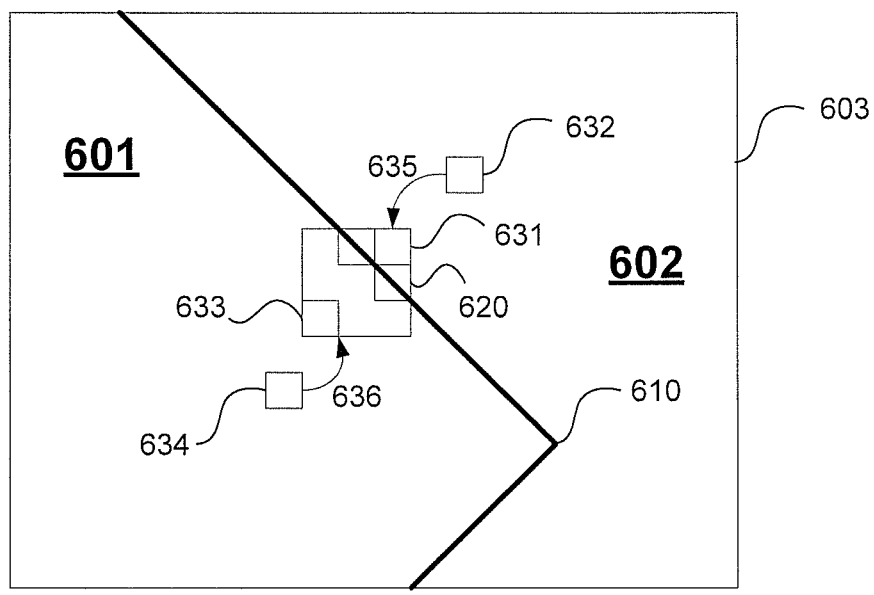
FIG. 6B illustrates a non-detailed search and pixel replacement process according to one embodiment of the present invention.

FIG. 6B illustrates a non-detailed search and pixel replacement process according to one embodiment of the present invention. If an error pixel is not on an edge, then the system may perform a search of pixel values in the current frame in a region adjacent to the edge 610 for the replacement pixel value. For example, in FIG. 6B there are two error pixels illustrated at 631 and 633. For error pixel 631, the system may search for pixels in a non-detailed (e.g., textured) region off the edge 610 near the error pixel 631. In this example, a pixel at 632 adjacent to and off of edge 610 may be a good match and may be copied to replace the error pixel at 631. Similarly, a pixel at 634 adjacent to and off of edge 610 may be a good match and may be copied to replace the error pixel at 633. From this example it can be seen that if the error pixel location is not on the edge, then error pixels on a first side of the edge are replaced with a foreground pixel, and error pixels on a second side of the edge are replaced with a background pixel. In the case illustrated in FIG. 6B, the foreground is a non-detailed or textured region of the object in motion, and the background is a non-detailed or textured region that the object is passing over.

In one embodiment, error concealment in non-detailed regions may be performed alternatively using a matching approach or another approach based on the distribution of values across a defined region. For example, in one embodiment, a suitable non-detailed region may be determined using a SAD match calculation across a defined region of pixels (e.g., an 11×5 region as above). In this case, a region including current pixels around the error pixel location is specified and a SAD match between the current pixels and pixels in a textured region is performed to find a best match.

However, in another embodiment, the system may replace error pixels by analyzing the distribution of pixels. For example, a region of pixels (e.g., 11×5) may be defined around the error pixel. The distribution of pixels across the region centered on the error pixel may be determined. The value of the error pixel may be assigned the mean or average of the distribution. If the distribution includes multiple modalities (e.g., if the distribution is a bi-modal distribution with two peaks), then the system may determine the number of modalities and select the modality having the largest number of values. The mean or average is then based on the selected modality.

Specifically, in one embodiment, the system may use a Markovian model for texture synthesis to replace error pixels. A non-detailed region may contain specific texture. The texture can be random or have a periodicity. Since periodic texture is often not a non-detailed error region, it can be assumed that the texture is random. A probable value for the target error pixel may be calculated based on the available pixels that are not part of the error region and has already been filled in. The probability distribution function of the surrounding pixels in a defined region centered at the target error pixel is computed. A Gaussian distribution may be assumed for simplicity. In this implementation, the mean of the Gaussian distribution may be taken as the target value that needs to be filled in.

Embodiments of the present invention may be implemented using a variety of hardware architectures. For example, embodiments of the present invention may be implemented in software executed on a computer using one or more processors, in a digital signal processor, or as a custom application specific integrated circuit. One application specific hardware implementation may be in a compensation and dynamic averaging block of an image processing system disclosed in U.S. patent application Ser. No. 12/400,207, entitled "Filter Bank Based Phase Correlation Architecture for Motion Estimation", filed Mar. 9, 2009, the entire disclosure of which is incorporated herein by reference.

Figure 7:
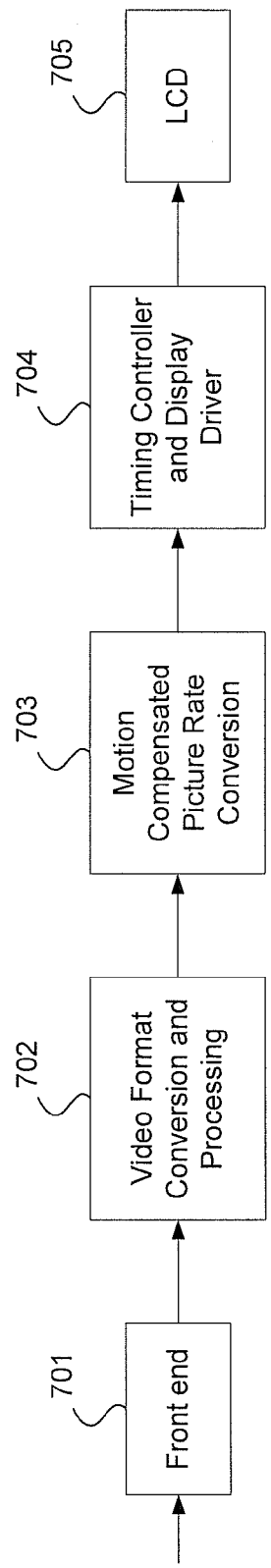
FIG. 7 illustrates an image processing system according to one embodiment of the present invention.

In one embodiment, the present invention may be used to correct movement between frames in an image processing system for an LCD system. FIG. 7 illustrates an image processing system according to an embodiment of the invention. Image processing system 700 includes front end 701, video format conversion and processing block 702, motion compensation and picture rate conversion block 703, timing controller and display driver block 704, and an LCD 705. Front end 701 includes input capture circuits such as analog-to-digital converters and demodulators, for example, to receive transmitted image data in a transmitted format and produce digital image data. Video format conversion and processing block 702 performs preprocessing including converting the digital image data into a native system format. The output of the video format conversion and processing block 702 are uncompensated frames of digital image data. Motion compensation and picture rate conversion block 703 compensates for errors generated, for example, when an object moves between two frames as described above. The output of motion compensation and picture rate conversion block 703 are compensated frames of digital image data. The compensated frames may be received by timing controller and display driver block 704, which drives an LCD 705. Further details of each of the above blocks are described in U.S. patent application Ser. No. 12/400,207, entitled "Filter Bank Based Phase Correlation Architecture for Motion Estimation" mentioned above.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
comparing, by one or more processors, a plurality of pixel values in a current frame to a plurality of reference values, wherein the plurality of reference values are based on a plurality of pixel values in a previous frame modified by a plurality of motion vectors associated with the plurality of pixel values in the previous frame; and
for each pixel value in the current frame that differs from a corresponding reference value by an amount greater than a predefined threshold:
determining, by the one or more processors, if an error pixel location corresponding to the pixel value in the current frame is on an edge of an object in the current frame;
if the error pixel location is on the edge, then performing a search of pixel values in the current frame along the edge for a replacement pixel value, and
if the error pixel location is not on the edge, then performing a search of pixel values in a region adjacent to the edge for the replacement pixel value.

2. The method of claim 1 wherein the comparing produces a plurality of difference values corresponding to the plurality of pixel values in the current frame.

3. The method of claim 2, wherein the region is a first region, the method further comprising defining a second region around each pixel in the current frame, the second region including a plurality of pixel values, wherein each difference value comprises a sum of absolute values of differences between the pixel values in the second region and corresponding reference values.

4. The method of claim 2 wherein if the error pixel location is not on the edge, then a first error pixel having a corresponding difference value greater than the threshold located on a first side of the edge is replaced with a foreground pixel, and a second error pixel having a corresponding difference value greater than the threshold located on a second side of the edge is replaced with a background pixel.

5. The method of claim 1 further comprising receiving an edge mask, wherein the determining is performed using the edge mask.

6. The method of claim 1 wherein each pixel value in the previous frame has a corresponding motion vector specifying motion of one or more objects represented in the previous frame.

7. The method of claim 1 wherein performing the search along the edge for the replacement pixel value comprises selecting a candidate pixel value that results in a minimum error for a pixel at the error pixel location of the current frame.

8. The method of claim 7 wherein performing the search along the edge for the replacement pixel value further comprises weighting candidate pixel values based on a distance from the error pixel location.

9. The method of claim 1 wherein if the error pixel location is not on the edge the method further comprises:
defining a second region around the error pixel location, the second region comprising a plurality of pixel values;
assigning a value to a pixel at the error pixel location of the current frame, said value equal to a mean of a distribution of values across the region.

10. The method of claim 9 further comprising determining a number of modalities of the distribution and selecting a modality having the largest number of values, wherein the mean is determined from the selected modality.

11. An image processing system comprising:
a front end to receive transmitted image data in a transmitted format and produce digital image data;
a format converter to convert the digital image data into a native system format;
a motion compensator to compare a plurality of pixel values in a current frame to a plurality of reference values, wherein the plurality of reference values are based on a plurality of pixel values in a previous frame modified by a plurality of motion vectors associated with the plurality of pixel values in the previous frame, and for each pixel value in the current frame that differs from a corresponding reference value by an amount greater than a predefined threshold:
  determining if an error pixel location corresponding to the pixel value in the current frame is on an edge of an object in the current frame;
  if the error pixel location is on the edge, then performing a search of pixel values in the current frame along the edge for a replacement pixel value, and
  if the error pixel location is not on the edge, then performing a search of pixel values in a region adjacent to the edge for the replacement pixel value; and
a display driver to drive a liquid crystal display.

12. The system of claim 11 wherein the motion compensator comparison produces a plurality of difference values corresponding to the plurality of pixel values in the current frame.

13. The system of claim 12, wherein the region is a first region, the motion compensator further defining a second region around each pixel in the current frame, the second region including a plurality of pixel values, wherein each difference value comprises a sum of absolute values of differences between the pixel values in the second region and corresponding reference values.

14. The system of claim 12 wherein if the error pixel location is not on the edge, then a first error pixel having a corresponding difference value greater than the threshold located on a first side of the edge is replaced with a foreground pixel, and a second error pixel having a corresponding difference value greater than the threshold located on a second side of the edge is replaced with a background pixel.

15. The system of claim 11 wherein the motion compensator further receives an edge mask, wherein the determining is performed using the edge mask.

16. The system of claim 11 wherein each pixel value in the previous frame has a corresponding motion vector specifying motion of one or more objects represented in the previous frame.

17. The system of claim 11 wherein performing the search along the edge for the replacement pixel value comprises selecting a candidate pixel value that results in a minimum error for a pixel at the error pixel location of the current frame.

18. The system of claim 17 wherein performing the search along the edge for the replacement pixel value further comprises weighting candidate pixel values based on a distance from the error pixel location.

19. The system of claim 11 wherein if the error pixel location is not on the edge, then the motion compensator defines a second region around the error pixel location, the second region comprising a plurality of pixel values, and assigns a value to a pixel at the error pixel location of the current frame, said value equal to a mean of a distribution of values across the region.

20. The system of claim 19 wherein the motion compensator determines a number of modalities of the distribution and selects a modality having the largest number of values, wherein the mean is determined from the selected modality.

\* \* \* \* \*